US012594902B2

(12) United States Patent
Fu et al.

(10) Patent No.: US 12,594,902 B2
(45) Date of Patent: Apr. 7, 2026

(54) VEHICLE WITH CONTROLLED HOOD MOVEMENT

(71) Applicant: FCA US LLC, Auburn Hills, MI (US)

(72) Inventors: Zuohong Fu, Shanghai (CN); Haifeng Guo, Shanghai (CN); Hongyu Wang, Shanghai (CN); Junjie Zhou, Shanghai (CN); Zhaoping Wang, Shanghai (CN)

(73) Assignee: FCA US LLC, Auburn Hills, MI (US)

( * ) Notice: Subject to any disclaimer, the term of this patent is extended or adjusted under 35 U.S.C. 154(b) by 242 days.

(21) Appl. No.: 18/459,570

(22) Filed: Sep. 1, 2023

(65) Prior Publication Data

US 2025/0074352 A1 Mar. 6, 2025

(51) Int. Cl.
| | |
|---|---|
| B60R 21/38 | (2011.01) |
| B60R 21/00 | (2006.01) |
| G06T 7/60 | (2017.01) |
| G06V 20/58 | (2022.01) |
| H04N 23/11 | (2023.01) |

(52) U.S. Cl.
CPC ............... B60R 21/38 (2013.01); G06T 7/60 (2013.01); G06V 20/58 (2022.01); B60R 2021/0004 (2013.01); G06T 2207/10048 (2013.01); G06T 2207/30196 (2013.01); G06T 2207/30252 (2013.01); H04N 23/11 (2023.01)

(58) Field of Classification Search
CPC ... B60R 21/38; B60R 2021/0004; G06T 7/60; G06T 2207/10048; G06V 20/58; H04N 23/11
See application file for complete search history.

(56) References Cited

U.S. PATENT DOCUMENTS

| | | | |
|---|---|---|---|
| 10,071,741 B2 * | 9/2018 | Lee ........................ | B60W 40/04 |
| 2020/0322588 A1 * | 10/2020 | Lindgren ................ | B60R 11/04 |
| 2022/0144199 A1 * | 5/2022 | Park .................. | B60R 21/01332 |
| 2024/0042959 A1 * | 2/2024 | Krishnamoorthy ..... | B60R 21/38 |

* cited by examiner

*Primary Examiner* — Ig T An
(74) *Attorney, Agent, or Firm* — Jeremy J. Klobucar

(57) ABSTRACT

In at least some implementations, a vehicle includes a body having a front end, a front compartment and a hood received over at least part of the front compartment. A hood moving assembly is coupled to the hood to move the hood away from the front compartment and from a closed position. A thermal camera is carried by the body and has a field of view that includes an area in front of the front end. And a controller is coupled to the thermal camera and to the hood moving assembly. The thermal camera provides an output to the controller from which a determination can be made of the presence of an animate object in the field of view, and wherein the controller is responsive to the output of the thermal camera to selectively actuate the hood moving assembly to move the vehicle hood.

15 Claims, 3 Drawing Sheets

VEHICLE WITH CONTROLLED HOOD MOVEMENT

FIELD

The present disclosure relates to a vehicle having a movable hood and a system and method for selectively moving the hood.

BACKGROUND

Some vehicles include actuators that, in an impact event, pop-up a vehicle hood to provide a gap between the vehicle hood and underlying engine components. The gap enables the hood to flex when a person impacts the hood and the flexing of the hood can reduce the severity of the impact and injury to the person. The systems used to actuate the hood pop-up actuator cause actuation even in impact events that do not involve a person. The unnecessary actuation requires the hood to be reset and this often involves repairs to the hood and or the pop-up actuator which can be time consuming and costly.

SUMMARY

In at least some implementations, a vehicle includes a body having a front end, a front compartment and a hood received over at least part of the front compartment. A hood moving assembly is coupled to the hood to move the hood away from the front compartment and from a closed position. A thermal camera is carried by the body and has a field of view that includes an area in front of the front end. And a controller is coupled to the thermal camera and to the hood moving assembly. The thermal camera provides an output to the controller from which a determination can be made of the presence of an animate object in the field of view, and wherein the controller is responsive to the output of the thermal camera to selectively actuate the hood moving assembly to move the vehicle hood.

In at least some implementations, the thermal camera utilizes infrared light. In at least some implementations, the output of the thermal camera also provides an indication of the size of an object in the field of view.

In at least some implementations, a second camera is coupled to the controller and provides an output to the controller that is indicative of the size of an object in a field of view of the second camera. In at least some implementations, the second camera utilizes visible light. In at least some implementations, the thermal camera utilizes infrared light and the size of an object in front of front end is indicated by the output of one or both of the thermal camera and the second camera, and whether the object is animate is indicated by the output of the thermal camera, and wherein the controller is arranged to actuate the hood moving assembly when the size of an object is greater than a threshold and when the object is determined to be animate.

In at least some implementations, the thermal camera utilizes infrared light and the size of an object in front of front end is indicated by the output of the thermal camera, and whether the object is animate is indicated by the output of the thermal camera, and wherein the controller is responsive to the output of the thermal camera to actuate the hood moving assembly when the size of an object is greater than a threshold and when the object is determined to be animate.

In at least some implementations, an impact sensor is arranged at the front end and that provides an output when the vehicle collides with an object, wherein the impact sensor is coupled to the controller and the controller is responsive to actuate the hood moving assembly as a function of both the output of the impact sensor and the output of the thermal camera.

In at least some implementations, a speed sensor provides an output indicative of the vehicle speed, wherein the speed sensor is coupled to the controller and the controller is responsive to actuate the hood moving assembly as a function of both the output of the speed sensor and the output of the thermal camera.

In at least some implementations, a method of controlling a hood moving assembly for a vehicle hood, includes determining if a size of an object in front of a vehicle is greater than a threshold, determining if the object is animate, and actuating the hood moving assembly to move the hood from a closed position when the size of the object is greater than a threshold and when the object is determined to be animate.

In at least some implementations, the step of determining if the object is animate is accomplished with a thermal camera. In at least some implementations, the thermal camera utilizes infrared light.

In at least some implementations, the step of determining if the object is animate is accomplished as a function of a determined temperature of the object. In at least some implementations, the temperature of the object is determined with a thermal camera. In at least some implementations, the step of determining if the object is animate is accomplished as a function of a determined shape of the object.

In at least some implementations, the method includes determining if the vehicle has impacted an object and wherein the step of actuating the hood moving assembly also includes determining that the vehicle has impacted an object before actuating the hood moving assembly. In at least some implementations, wherein the step of determining if the vehicle has impacted an object is done with sensors used to deploy an airbag of the vehicle.

In at least some implementations, the method includes determining an imminent impact with an object in front of the vehicle and wherein the step of actuating the hood moving assembly also includes determining that vehicle impact with an object is imminent before actuating the hood moving assembly. In at least some implementations, wherein the step of determining an imminent impact with an object is determined as a function of the speed of the vehicle and the distance to the object.

Further areas of applicability of the present disclosure will become apparent from the detailed description, claims and drawings provided hereinafter. It should be understood that the summary and detailed description, including the disclosed embodiments and drawings, are merely exemplary in nature intended for purposes of illustration only and are not intended to limit the scope of the invention, its application or use. Thus, variations that do not depart from the gist of the disclosure are intended to be within the scope of the invention.

DETAILED DESCRIPTION

Figure 1:
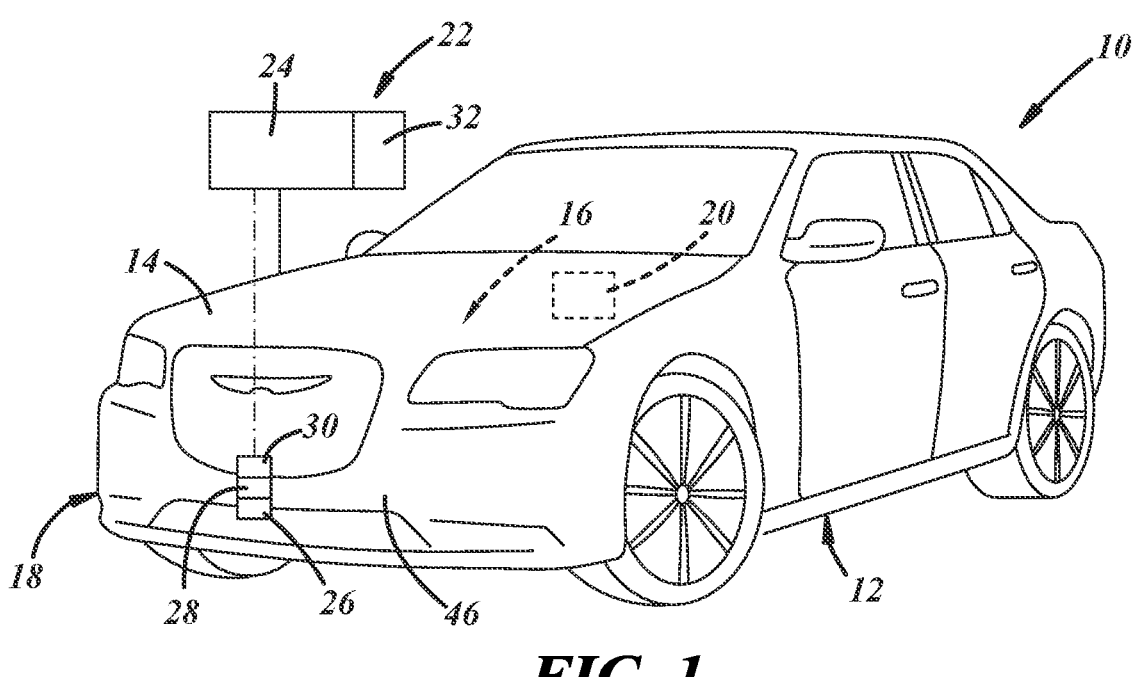
FIG. 1 is a diagrammatic view of a vehicle including a hood moving assembly and various sensors and controllers used in actuation of the hood moving assembly.
Figure 2:
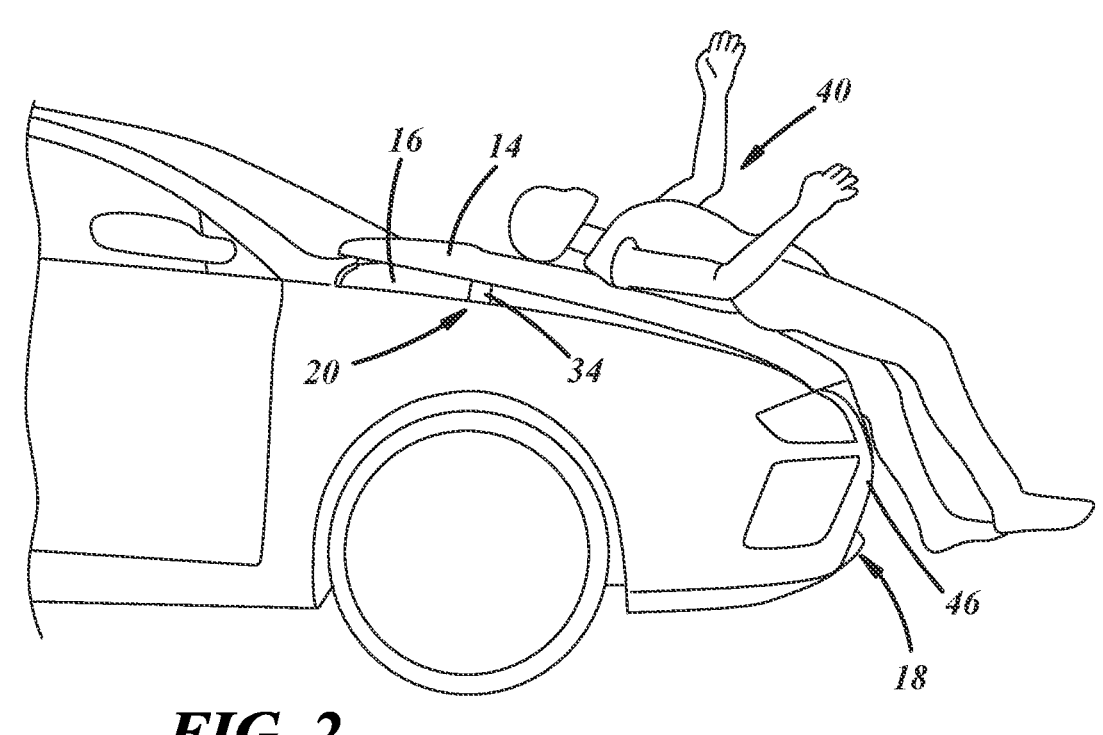
FIG. 2 is a perspective view of part of a vehicle with a hood in a deployed position.

Referring in more detail to the drawings, FIG. 1 illustrates a vehicle 10 with a body 12 having a hood 14 overlying at least part of a compartment 16 near the front end 18 of the vehicle 10 and in which powertrain components may be received. A hood moving assembly 20 is located in or adjacent to the front compartment 16 and is coupled to the hood 14 to displace the hood 14 away from a closed position, as shown in FIG. 1, to a deployed position, as shown in FIG. 2, when the vehicle impacts a pedestrian. To manage the actuation of the hood moving assembly 20, among other things, the vehicle includes a control system 22 that includes a controller 24 and a thermal camera 26 coupled to the controller 24. The vehicle 10 may also include, and the controller 24 may be communicated with, one or more of a second camera 28, an impact sensor 30 and a vehicle speed sensor 32, among other things.

The hood moving assembly 20 may include an actuator 34 (FIG. 2) having a portion that moves to displace the hood 14 from a closed position to a partially open, deployed position. The actuator 34 may be any desired type such as, by way of a non-limiting example, a gas cylinder or gas generator, such as a micro gas generator with a rod driven relative to the cylinder to displace the hood 14 from the closed position by a desired amount. For example, the cylinder may be coupled to a structural component of the vehicle body and the rod may be coupled to the hood 14 or a hinge or bracket for the hood 14. Displacement of the rod may be initiated by the controller 24.

In order to perform the prescribed functions and desired processing, as well as the computations therefore (e.g., the identification of a pedestrian impact, control algorithm(s), and the like), controller 24 may include, but not be limited to, a processor(s), computer(s), DSP(s), memory, storage, register(s), timing, interrupt(s), communication interface(s), and input/output signal interfaces, and the like, as well as combinations comprising at least one of the foregoing. For example, controller 24 may include input signal processing and filtering to enable accurate sampling and conversion or acquisitions of such signals from sensors and communications interfaces.

As used herein the terms control system 20 or controller 24 may refer to one or more processing circuits such as an application specific integrated circuit (ASIC), an electronic circuit, a processor (shared, dedicated, or group) and memory that executes one or more software or firmware programs, a combinational logic circuit, and/or other suitable components that provide the described functionality.

The thermal camera 26 is mounted on the vehicle 10 and has a field of view that includes an area 35 (FIGS. 3 and 4) in front of the vehicle that is in the path of travel of the vehicle when the vehicle is driving in a forward direction. The thermal camera 26 may provide an output to the controller 24 that is indicative of the temperature or relative temperature of objects within the field of view of the camera. The thermal camera 26 may include a sensor, sometimes called an imaging sensor, that is responsive to infrared radiated heat and may include components that convert the infrared radiations to an output that may be perceived and/or analyzed by a controller 24. Some thermal cameras provide a visual display, a video, image or thermograph, in which different colors represent different temperatures or ranges of temperatures. From the output of the thermal camera 26, the temperature or relative temperature of an object in the field of view of the thermal camera 26 can be determined.

Figure 3:
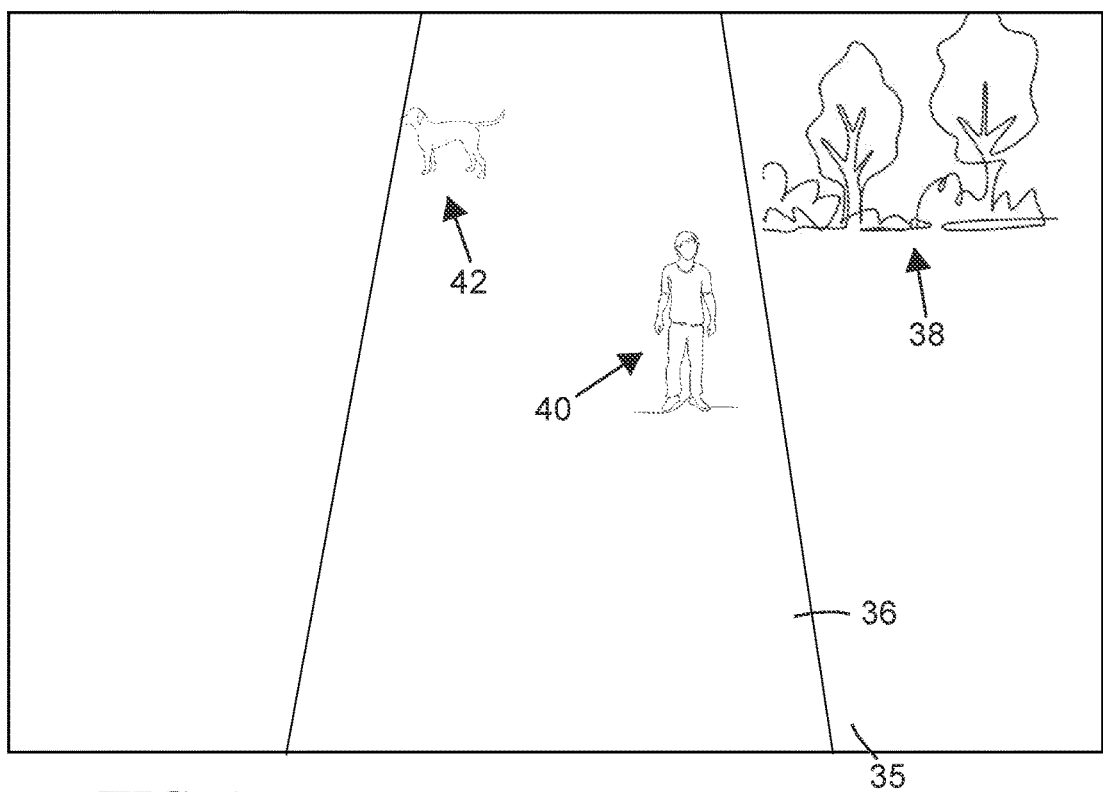
FIG. 3 is a view of a vehicle display showing an output from a thermal camera including a person.
Figure 4:
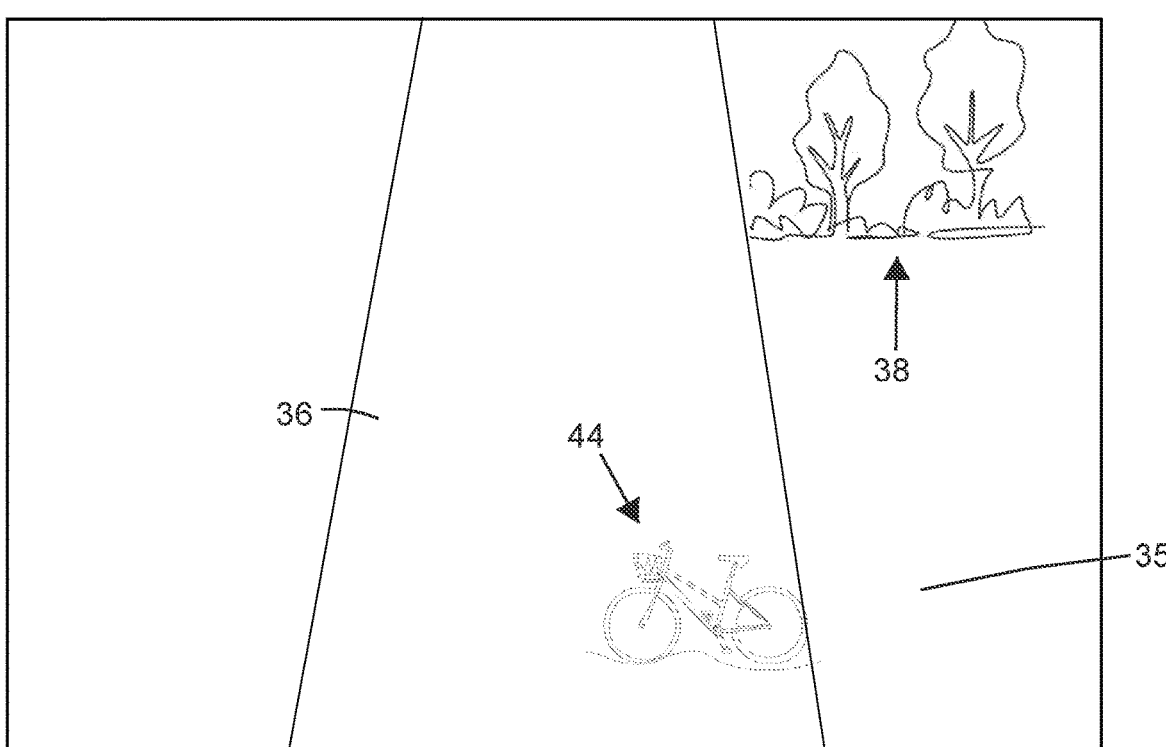
FIG. 4 is a view of a vehicle display showing an output from a thermal camera including a person.

In the examples shown in FIGS. 3 and 4, the thermal camera output includes or may be converted to an image that shows objects as a function of their infrared radiation. From this camera output, the temperature or relative temperature of things like the road 36, trees or bushes 38, a person 40 (FIG. 3), a dog 42 (FIG. 3) and a bicycle 44 (FIG. 4) can be determined. Further, the relative size, motion and location of the objects may be determined by analysis of the camera output.

In at least some implementations, the controller 24 is arranged to determine if a person 40 is present within the field of view of the thermal camera 26, or within the portion of the vehicle path of travel that is within the field of view of the thermal camera 26. This determination may be made as a function of one or more of the size, shape, temperature and movement of an object, which may individually or collectively be defined by criteria or thresholds to enable the system to determine when a person 40 is present in the field of view.

Further, the system may determine if an object over a certain size threshold is present in the path of travel. Smaller objects, including people, whose head or body portions are unlikely to hit the hood 14 of the vehicle during an impact with the vehicle, might not cause the hood moving assembly 20 to be actuated, in some implementations. The size determination may also reduce the false actuations of the hood moving assembly 20 in impacts with smaller animals, for example, As shown in FIG. 1, the vehicle 10 may also include a second camera 28. The second camera 28 may include a sensor that is responsive and sensitive to visible light, and the second camera 28 may provide an output like an image or video (e.g. images at some framerate) to the controller 24. The controller 24 may be arranged to determine if a person is present within the field of view of the second camera 28, which may be done by determining the size, shape and/or movement or patterns of movement of objects within the field of view of the second camera 28.

The vehicle 10 may also include an impact sensor 30 that is communicated with the control system 22 and provide an output that indicates that the vehicle 10 has impacted an object. The impact sensor 30 may be part of a safety system, such as may be used to deploy vehicle air bags or seat belt pretensioners, for example. Any suitable sensor or sensors may be used as an impact sensor 30, such as pressure/force and accelerations sensors. The impact sensor 30 may be carried by the vehicle 10, at the front end 18 of the vehicle, such as at or near a front bumper 46 (FIGS. 1 and 2) or front fascia component, and provides an indication of an impact of the front of the vehicle with an object.

In some implementations, the output from the second camera 28 may be used to determine if an impact has occurred or is imminent, as will be discussed in more detail below. Such analysis of camera data may be used in other systems, like automatic emergency braking systems that engage vehicle brakes to slow a vehicle when impact with an object is determined to be imminent without such braking. In this way, the second camera 28 may be deemed to be an impact sensor 30. Such cameras may be used in various levels of Advanced Driving Assistance Systems (ADAS), such as level 2 or higher systems.

The vehicle 10 may further include a speed sensor 32 that is communicated with the control system 22 and provides an output indicative of the speed at which the vehicle 10 is moving. From the output of one or both cameras 26, 28, the distance of an object from the vehicle 10 can be determined, and in combination with the vehicle speed, a time for the vehicle to be at the location of the object can be determined. Further, in at least some implementations, a time or distance for the vehicle 10 to come to a stop or reduce speed below a threshold may be determined or programmed into the control system (e.g. in a lookup table, data map or the like). From the distance and speed information, the control system 22 can determine when an impact is imminent. Further, the control system 22 can determine when the speed of the vehicle at the time of the impact will be greater than a threshold (e.g. 3 mph), where speeds lower than the threshold might not require or benefit from deployment of the hood moving assembly 20, in at least some implementations.

Figure 5:
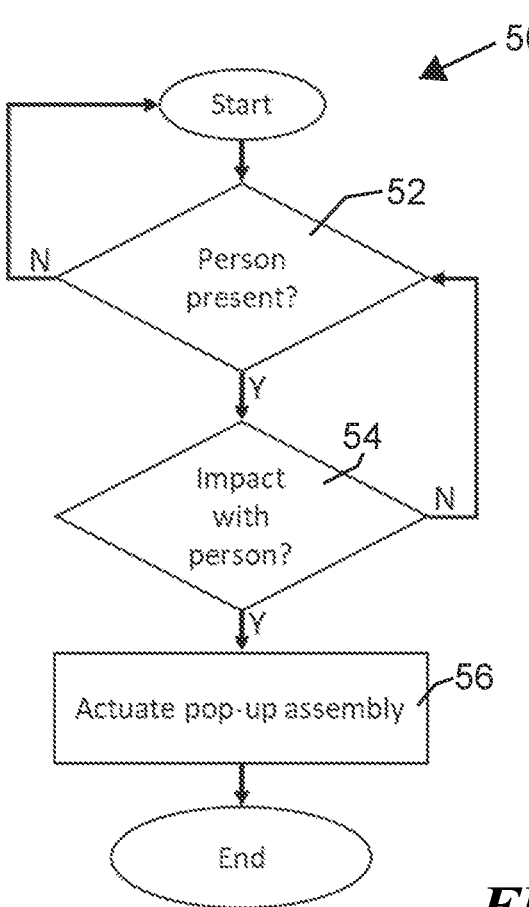
FIG. 5 is a flowchart of a method for controlling a hood moving assembly.

A method 50 of controlling a hood moving assembly 20 is shown in FIG. 5. The method includes a step 52 of determining if a person 40 is present in front of/in the path of travel of the vehicle 10. This determination may be made by analysis of the output of the thermal camera 26 and/or a second camera 28 if provided, as noted above. If a person 40 is determined to not be present in front of/in the path of travel of the vehicle 10 (e.g. as shown in FIG. 4), then the method 50 may return to the start to be ready for a different/future object analysis. If a person 40 is determined to be present in front of/in the path of travel of the vehicle 10 (e.g. as shown in FIG. 3), then the method 50 continues to step 54.

In step 54, it is determined if the vehicle 10 has made impact with the person 40. This determination may be made by analysis of the output of the one or more impact sensors 30 and/or the output from the first and/or second camera 26, 28. If impact with a person 40 is determined to have occurred, then the method 50 continues to step 56 in which the hood moving assembly 20 is actuated. If impact is not detected, then the method 50 may return to step 52 to check for presence of a person 40 in front of the vehicle 10.

Figure 6:
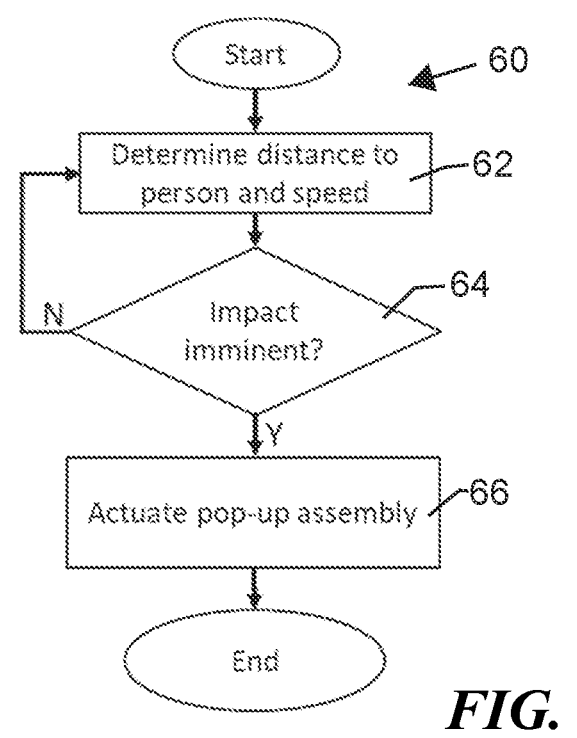
FIG. 6 is a flowchart of a method for controlling a hood moving assembly.

In the method 60 of FIG. 6, rather than wait for positive indication of an impact event, a determination is made that an impact with a person 40 is imminent so that the hood moving assembly 20 can be actuated sooner. The determination that an impact is imminent may be made as a function of the vehicle speed, distance to a person, the vehicle braking capacity (e.g. can the vehicle stop before the impact, or sufficiently reduce speed to a nominal impact not requiring actuation of the hood moving assembly 20) and the vehicle steering capacity (e.g. can the vehicle be turned to avoid impact), and perhaps assumed ability of the person to move away from the vehicle's path of travel.

With regard to the method of FIG. 6, in step 62, the distance to a person 40 (e.g. an object in the camera field of view that is determined to be a person, such as is shown in FIG. 3) is determined, as is the vehicle speed. From this information, in step 64, a determination can be made if impact with the person 40 is imminent, and if so, then the hood moving assembly 20 can be actuated in step 66. To avoid false indications of impact, which would cause unnecessary actuation of the hood moving assembly 20, the system may be set up to ensure impact will not be avoided, and when that higher threshold is not met to also actuate the hood moving assembly 20 upon detection of an impact, such as set forth in the method of FIG. 5.

With the systems and method set forth herein, a hood moving assembly 20 for a vehicle hood 14 can be controlled to avoid or limit the occurrences of false actuations which can cost time and money to correct or repair. The systems and methods may use one or more cameras 26, 28 that provide an indication of an object's temperature and size, and perhaps shape and pattern of movement. From the outputs of the camera(s) 26, 28, the system can determine objects that are not a person and avoid actuating the hood moving assembly 20 in the event of an impact with such objects determined to not be a person. In at least some implementations, the hood moving assembly 20 could be actuated only when it is determined that a person is present in front of the vehicle immediately before or during an impact event. In at least some implementations, the hood moving assembly could be actuated only when it is positively determined that an object is not a person, and if a positive determination is not made, then impact with any object could result in actuation of the hood moving assembly. Thus, when the vehicle hits a tree, bush, box or other inanimate object, or a small animal, the system can avoid actuation of the hood moving assembly 20.

What is claimed is:

1. A vehicle, comprising:
a body having a front end, defining a front compartment and having a hood received over at least part of the front compartment;
a hood moving assembly coupled to the hood to move the hood away from the front compartment and from a closed position;
a speed sensor that provides an output indicative of a vehicle speed;
a distance sensor operable to determine a distance to an object in front of the front end;
a thermal camera carried by the body and having a field of view that includes an area in front of the front end; and
a controller coupled to the thermal camera and to the hood moving assembly, wherein the thermal camera provides an output to the controller from which determination can be made of the presence of an animate object in the field of view, and wherein the speed sensor and the distance sensor are communicated with the controller so that the controller can determine, as a function of the vehicle speed and the distance to the animate object, that an impact with the animate object is imminent, and wherein the controller is responsive to the output of the speed sensor, the distance sensor and the thermal camera to selectively actuate the hood moving assembly to move the vehicle hood when impact with the animate object is imminent and when the vehicle speed is greater than a threshold.

2. The vehicle of claim 1 wherein the thermal camera utilizes infrared light.

3. The vehicle of claim 1 wherein the output of the thermal camera also provides an indication of the size of an object in the field of view.

4. The vehicle of claim 1 which also includes a second camera coupled to the controller and providing an output to the controller that is indicative of the size of an object in a field of view of the second camera.

5. The vehicle of claim 4 wherein the second camera utilizes visible light.

6. The vehicle of claim 5 wherein the thermal camera utilizes infrared light and the size of an object in front of front end is indicated by the output of one or both of the thermal camera and the second camera, and whether the object is animate is indicated by the output of the thermal camera, and wherein the controller is arranged to actuate the hood moving assembly when the size of an object is greater than a threshold and when the object is determined to be animate.

7. The vehicle of claim 1 wherein the thermal camera utilizes infrared light and the size of an object in front of front end is indicated by the output of the thermal camera, and whether the object is animate is indicated by the output of the thermal camera, and wherein the controller is responsive to the output of the thermal camera to actuate the hood moving assembly when the size of an object is greater than a threshold and when the object is determined to be animate.

8. The vehicle of claim 1 which also includes an impact sensor arranged at the front end and that provides an output when the vehicle collides with an object, wherein the impact sensor is coupled to the controller and the controller is responsive to actuate the hood moving assembly as a function of both the output of the impact sensor and the output of the thermal camera.

9. The vehicle of claim 1 wherein the speed sensor is coupled to the controller and the controller is responsive to actuate the hood moving assembly as a function of both the output of the speed sensor and the output of the thermal camera.

10. A method of controlling a hood moving assembly for a vehicle hood, comprising:

determining if a size of an object in front of a vehicle is greater than a threshold;

determining that the object is animate;

determining a distance to the animate object;

determining a vehicle speed;

determining that an impact with the animate object is imminent, where the determination that the impact is imminent is done as a function of the speed of the vehicle and the distance to the object; and actuating the hood moving assembly to move the hood from a closed position when the size of the object is greater than a threshold, when the vehicle speed is greater than a threshold speed, and when the object is determined to be animate and when the impact with the object is determined to be imminent.

11. The method of claim 10 wherein the step of determining if the object is animate is accomplished with a thermal camera.

12. The method of claim 11 wherein the thermal camera utilizes infrared light.

13. The method of claim 10 wherein the step of determining if the object is animate is accomplished as a function of a determined temperature of the object.

14. The method of claim 13 wherein the temperature of the object is determined with a thermal camera.

15. The method of claim 13 wherein the step of determining if the object is animate is accomplished as a function of a determined shape of the object.

* * * * *